United States Patent
Weerts et al.

(10) Patent No.: US 9,108,475 B2
(45) Date of Patent: Aug. 18, 2015

(54) LOCKING PLATE FOR TENSION TIRE CHAINS

(75) Inventors: Mathis Weerts, Aalen (DE); Ruediger Wendt, Boebingen (DE); Bernd Roesler, Aalen-Wasseralfingen (DE)

(73) Assignee: Erlau AG, Aalen (DE)

( * ) Notice: Subject to any disclaimer, the term of this patent is extended or adjusted under 35 U.S.C. 154(b) by 687 days.

(21) Appl. No.: 13/334,725

(22) Filed: Dec. 22, 2011

(65) Prior Publication Data

US 2012/0186713 A1    Jul. 26, 2012

(30) Foreign Application Priority Data

Dec. 23, 2010   (DE) .......................... 10 2010 064 146

(51) Int. Cl.
*B60C 27/00* (2006.01)
*B60C 27/10* (2006.01)
*F16G 15/04* (2006.01)

(52) U.S. Cl.
CPC ................ *B60C 27/10* (2013.01); *F16G 15/04* (2013.01)

(58) Field of Classification Search
CPC ............ B60C 27/0207; B60C 27/0238; B60C 27/062; B60C 27/08; B60C 27/10
USPC ......... 152/217, 218, 219, 223, 231, 232, 233, 152/234, 235, 236, 237, 238, 239, 243, 244
See application file for complete search history.

(56) References Cited

U.S. PATENT DOCUMENTS

| | | | | |
|---|---|---|---|---|
| 3,882,918 A | * | 5/1975 | Muller ...................... | 152/213 R |
| 4,416,319 A | * | 11/1983 | Hofmann .................. | 152/213 R |
| 4,542,779 A | * | 9/1985 | Muller et al. ............. | 152/213 A |
| 4,585,117 A | * | 4/1986 | Hahn .......................... | 198/731 |
| 5,170,827 A | * | 12/1992 | Urleb et al. ................ | 152/225 C |
| 5,920,962 A | * | 7/1999 | Franklin ..................... | 24/116 R |
| 6,889,734 B2 | * | 5/2005 | Deger et al. ............... | 152/213 A |
| 2004/0045648 A1 | | 3/2004 | Deger et al. | |

FOREIGN PATENT DOCUMENTS

| | | |
|---|---|---|
| AT | 287 147 B | 10/1968 |
| DE | 31 29 907 A1 | 2/1983 |
| DE | 32 27 995 A1 | 1/1984 |
| DE | 33 08 747 A1 | 9/1984 |
| DE | 86 32 620 U1 | 4/1988 |
| DE | 93 14 307.9 U1 | 3/1994 |
| DE | 101 05 410 C1 | 7/2002 |
| GB | 2 127 129 | 4/1984 |
| WO | WO 2004/087553 A1 | 10/2004 |

\* cited by examiner

*Primary Examiner* — S. Joseph Morano
*Assistant Examiner* — Jean Charleston
(74) *Attorney, Agent, or Firm* — Stroock & Stroock & Lavan LLP

(57) ABSTRACT

The invention relates to a locking plate (1) for tensioning a tire chain by means of a ten-sioning chain (46), and to an arrangement, comprising a locking plate (1) and a pull-through bracket (40). The locking plate comprises a locking slot (10) whose clear width is greater than a thickness and smaller than an outer width of the chain links (34) of the tensioning chain, and with a pull-through opening with an inner contour into which an outer contour of the tensioning chain can be entered. The tensioning chain can be captively received in the locking plate transversely to its longitudinal extension to be movable between a locking position (18) arranged in the region of the locking slot and a pull-through position (16) arranged in the region of the pull-through opening.

16 Claims, 3 Drawing Sheets

LOCKING PLATE FOR TENSION TIRE CHAINS

BACKGROUND

1. Field of the Invention

The invention relates to a locking plate for tensioning tire chains with the aid of a tensioning chain having a locking slot, and to an arrangement for tensioning a tire chain with the aid of a tensioning chain, wherein the arrangement comprises a locking plate and a pull-through bracket.

2. Description of the Related Art

Tire chains, which include, for example, nonskid and tire protection chains, are placed over the tread of a vehicle tire such that they come to lie in the region of the tire's footprint between the tire and the ground. Nonskid chains increase traction on slippery grounds, such as ice, snow or sludge or slush. Tire protection chains form a chain shield around the tire to prevent it from being damaged. Moreover, there are also combined forms, such as tire protection chains which simultaneously increase traction.

In particular with very large tires, as they are employed, for example, in trucks or in special vehicles on construction sites or in mining, the tire chains are often tensioned by a tensioning chain. The tensioning chain is lying in the region of the tire's side facing away from the vehicle body to the outside and extends concentrically around the axle of the wheel supporting the tire. The chain mesh of the tire chain allocated to the tread of the tire is connected with the tensioning chain at several points spaced apart in the circumferential direction of the tensioning chain by means of pull-through brackets. By tensioning the tensioning chain, the circle formed by it is reduced, the tire chain being thereby tightly pulled over the tread. DE 23 11 291 C2 and DE 193 80 15 U show tire chains which are tensioned by a tensioning chain.

With tire chains for large tires, very high tension forces are required to tightly pull the tire chain over the tread. Moreover, the tire chain is often tensioned on site under unfavorable circumstances. Tensioning a tire chain thus quite often involves a considerable amount of effort.

If the tire chain is not carefully tensioned, this can lead to damage to the tire chain or the tire and result in substantial downtimes. On construction sites or in mining, such downtimes can lead to considerable outage losses exceeding the value of the material to be replaced.

SUMMARY

It is therefore an object of the invention to provide means by which a tire chain can be easily and securely tensioned with a low proneness for error.

This object is achieved according to an embodiment of the invention by a locking plate for tensioning tire chains by means of a tensioning chain, with a locking slot whose clear width is greater than a thickness and smaller than an outer width of the chain links of the tensioning chain, and with a pull-through opening having an inner contour into which an outer contour of the tensioning chain can be entered, and wherein the tensioning chain is captively movable, transverse to its longitudinal extension, between a locking position arranged in the region of the locking slot and a pull-through position arranged in the region of the pull-through opening.

Furthermore, the object is achieved according to the invention by an arrangement for tensioning a tire chain with the aid of a tensioning chain, wherein the arrangement comprises a locking plate with a pull-through opening and a locking slot connected to the pull-through opening, wherein the tensioning chain is movable between a pull-through position arranged in the region of the pull-through opening and a locking position arranged in the region of the locking slot, and comprises a pull-through bracket with at least two pull-through openings, wherein the locking plate and the pull-through bracket are designed such that they can be arranged in an operating position in which the locking position is aligned with the one, and the pull-through position is aligned with the other pull-through opening of the pull-through bracket.

The arrangement of the tensioning position in the region of the locking slot comprises the at least partial arrangement in the locking slot, and the arrangement of the pull-through position in the region of the pull-through opening comprises the at least partial arrangement in the through opening.

This structurally simple solution permits a secure and not very error-prone tensioning of the tensioning chain matching the locking plate. The tensioning chain can be pulled through the pull-through opening during tensioning until the desired tension force is achieved. Subsequently, the tensioning chain is simply transferred to the tensioning position in which it is then retained by the edges of the tensioning slot. Since the tensioning chain is captively retained in the locking plate transversely to its longitudinal direction, the locking plate cannot laterally fall away from the tensioning chain.

In combination with the pull-through bracket, the arrangement according to the invention is advantageous in that the tensioning chain automatically assumes the locking position due to the aligned position of both pull-through openings of the pull-through bracket with the pull-through position and the locking position of the locking plate, when the tensioning chain is, as usual, guided in a loop first through the one pull-through opening of the pull-through bracket and then through the locking slot of the locking plate, and is subsequently guided back again through the pull-through opening of the locking plate and the other pull-through opening of the pull-through bracket.

The geometrically simple embodiment of the locking plate prevents operating errors.

The solution according to an embodiment of the invention can be further improved as follows by further embodiments which are each advantageous for themselves and independent of another.

For example, according to a particularly advantageous embodiment, at least one retaining means cooperating with the tensioning chain can be provided between the locking position and the pull-through position. The retaining means prevents the tensioning chain from automatically moving out of the locking position, for example under the action of gravity. By this, the tensioning of the tire chain becomes more secure even in difficult situations. The retaining means can in particular comprise a catch projection by which the tensioning chain locks into place in the tensioning position.

The catch projection can be preferably arranged in a region over which the tensioning chain passes during its movement from the pull-through to the locking position.

In a further advantageous embodiment, the catch projection can extend into the locking slot in the direction transverse to the longitudinal extension of the tensioning chain, so that it engages with the respective chain link located in the locking slot. The advantage of this embodiment is that locking security is increased if, in the movement from the pull-through to the tensioning position, both legs of the chain link located in the locking slot must be moved past the at least one catch projection, and the at least one catch projection engages with each of the two legs of this chain link. If the tensioning chain thus has not completely reached the locking position, the tensioning chain is nevertheless already retained if only the first leg is moved to the at least one catch projection. However, this early engagement can also lead to operating errors, for example, if the personnel wrongly assume that the locking position is already reached after the engagement of the first leg of the chain link located in the tensioning slot. Moreover, the assembly of the catch projection is somewhat more complicated in this embodiment as the catch projection does not only have to be secured against coming off in the direction towards the locking slot, but also in the longitudinal direction of the chain in the locking plate.

If the at least one catch projection projects into the locking slot, according to a further advantageous embodiment, the width of the slot is at this point smaller than the thickness of the chain links of the tensioning chain. The tensioning chain can now be moved past by deflecting the catch projection.

It might therefore be somewhat more advantageous if, according to an alternative or additional embodiment, the at least one catch projection extends away from the locking plate in the longitudinal direction of the tensioning chain. In this embodiment, the at least one catch projection projects from at least one flat side of the locking plate and cooperates with the chain link or chain links adjacent to the chain link located in the locking slot. This embodiment permits a simple assembly of the catch projections. Moreover, in this embodiment, the tension force acting in the tensioning chain supports the catching effect of the catch projection because it pulls the tensioning chain against the catch projection.

The at least one catch projection can be embodied to be elastically deflectable at least in sections and comprise, for example, a spring element. By sliding the tensioning chain past it from the pull-through to the locking position or back, the catch projection can be elastically pushed away with this embodiment. Elasticity is here advantageously dimensioned such that forces manually applied by the operator are sufficient for deflecting the at least one catch projection.

In particular, the at least one catch projection can comprise an elastically deformable, for example compressible catch knob. The catch knob can be made of natural rubber, caoutchouc and/or plastic material. The catch knob can be dumbbell-shaped and project from either flat side of the locking plate. The catch knob can penetrate the locking plate. In a particularly simple embodiment, the retaining means can consist only of elastically deformable bodies which are fixed to the locking plate and form the catch knob with a section.

If the catch projection projects from the flat side of the locking plate in the longitudinal direction of the tensioning chain, according to a further advantageous embodiment, the thickness of the locking plate including the at least one catch projection at the location of the at least one catch projection can be greater than the greatest distance of two chain links of the tensioning chain separated by a chain link, or their bows facing each other at this point. In this embodiment, the tensioning chain can only be shifted from the pull-through position to the locking position if the catch projection is released from the overlap with the bow of the chain link adjacent to the locking plate. Deformation is here effected by the rounded bow of the chain link or chain links facing the locking plate which are directly adjacent to the chain link inserted in the locking slot.

It is furthermore advantageous for the distance between the pull-through position and the locking position to be dimensioned such that the length of the loop of the tensioning chain between the locking position and the pull-through position corresponds exactly to one chain link (or an integer number of chain links). This is achieved according to an advantageous embodiment if the amount of the distance of the center of the locking position to the center of the pull-through position is between the sum on the one hand of the inner clear length and the inner clear width, and on the other hand the sum of the outer length and the outer width of the chain links of the tensioning chain. A tight tension of the loop with a length of several chain links can be achieved by a distance corresponding to an integral multiple of this region.

According to a particularly advantageous embodiment of the arrangement for tensioning the tire chain with the aid of the tensioning chain, the position of the locking plate relative to the pull-through bracket can be fixed by cooperating positioning elements at the pull-through bracket and the locking plate, when the locking plate and the pull-through bracket nearly abut in a plane transverse to the longitudinal direction of the tensioning chain. If in this embodiment, the locking plate is pressed against the pull-through bracket by the tension force acting in the tensioning chain, the locking plate can no longer be shifted relative to the pull-through bracket due to the positioning elements and in particular automatically assumes its secure operating position. The positioning elements can also form a protection against incorrect insertion which permits a positionally correct abutment of the locking plate and the pull-through bracket in only one operating position.

Preferably, the at least one catch projection of the locking plate can simultaneously function as a positioning element.

Due to the aligned arrangement of the openings of the locking plate and the openings of the pull-through bracket, the arrangement according to various embodiments of the invention does not require any additional fixing elements by means of which the locking plate is fixed to the pull-through bracket in the longitudinal direction of the tensioning chain. Due to its geometrical adaption to the tensioning chain and the pull-through bracket due to the looping through of the tensioning chain, the locking plate is retained in the operating position. Thus, according to a further advantageous embodiment, in the operating position, the locking plate and the pull-through bracket are pressed against each other essentially exclusively by a tension force prevailing in the tensioning chain.

BRIEF DESCRIPTION OF THE DRAWINGS

Below, the invention will be illustrated more in detail by embodiments only given by way of example with reference to the drawings. The different features of the various embodiments can here be arbitrarily combined with each other. Individual features can also be omitted if the above-described advantages are not relevant in certain applications.

In the drawings, the same reference numerals are used for elements of identical function or construction in the various embodiments.

In the drawings:

FIG. 1 shows a first embodiment of a locking plate according to the invention in a schematic perspective representation;

FIG. 2 shows the locking plate of FIG. 1 in a schematic representation seen in a viewing direction II of FIG. 1;

FIG. 3 shows a second embodiment of a locking plate according to the invention in a schematic perspective representation;

FIG. 4 shows a third embodiment of a locking plate according to the invention in a schematic perspective representation;

FIG. 5 shows an embodiment of an arrangement according to the invention, comprising a locking plate and a pull-through bracket, in a schematic perspective representation during the tensioning operation;

FIG. 6 shows the arrangement of FIG. 5 in a schematic perspective representation of an operating position; and FIG. 7 shows a schematic representation of a chain link of the tensioning chain for illustrating dimensions.

DETAILED DESCRIPTION

First, the construction of a locking plate according to an embodiment of the invention will be described with reference to the embodiment of FIG. 1.

Figure 1:
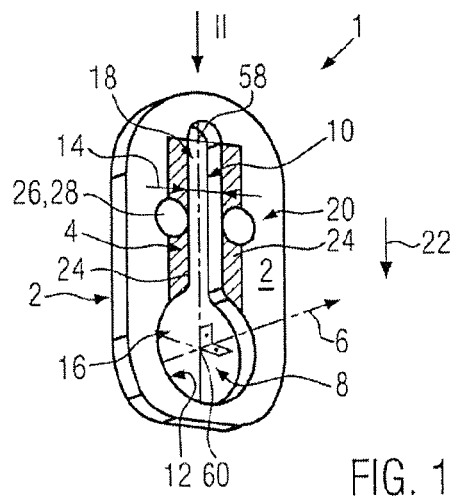

FIG. 1 shows a locking plate 1 in a schematic perspective representation of one of the two flat sides 2.

The locking plate 1 is preferably made of a metal material, for example steel, or of a particularly break-proof plastic which is preferably fiber-reinforced. The locking plate 1 is preferably formed to be mirror-symmetrical, so that the two flat sides are identical to prevent operating errors caused by confusion of sides.

The locking plate 1 is provided with an opening 4 that opens to the flat sides 2 and penetrates the locking plate 1 into which a tensioning chain (not shown), as it is in particular used for tensioning tire chains, can be captively inserted. The dimensions of the locking plate 1 and its elements are adapted to the dimensions of the tensioning chain. The longitudinal direction 6 of the chain only schematically indicated in FIG. 1 here extends perpendicularly to the flat sides 2 and the plane spanned by the opening 4. In the direction transverse to the longitudinal direction, the chain is captively retained by the locking plate 1.

In the embodiment of FIG. 1, captivity is ensured by the opening 4 being limited all-around. If the opening 4 comprises a slot open to the outside in the direction transverse to the longitudinal direction 6, it must not be wider than the tensioning chain passing through the opening 4, so that the tensioning chain cannot slip out of the opening 4 in this direction.

The opening 4 in particular comprises a pull-through opening 8 and a locking slot 10.

The pull-through opening 8 comprises a passage contour 12 into which an outer contour of the tensioning chain allocated to the locking plate 1 can be entered. Thus, the tensioning chain can be pulled through the pull-through opening 8 in the longitudinal direction 6 without blocking.

The locking slot 10 has a clear width 14 which is smaller than an outer width of the chain links of the tensioning chain. As to the dimensions of the chain links of the tensioning chain, reference is made to explanations concerning FIG. 7 at the end of the description. Thus, a chain link can be inserted into the locking slot 10 in the direction of its narrow side or away from the pull-through opening, respectively. In the locking slot, the tensioning chain can no longer be pulled through the locking plate 1 in the longitudinal direction 6 as the chain links adjacent to the chain links inserted into the locking slot 10 block the movement through the locking slot in the longitudinal direction 6.

The tensioning chain received in the pull-through opening 8 can be moved between a pull-through position 16 arranged in the region of the pull-through opening 8 and a locking position 18 arranged in the region of the locking slot 10. For this, the locking slot and the pull-through opening 8 are connected to each other. For example, as shown in FIG. 1, the locking slot 10 can directly run into the pull-through opening 8. Between the locking position and the pull-through position, a retaining means 20 is arranged which restricts the free movability of the tensioning chain from the locking position to the pull-through position, and optionally also vice-versa. The movement from the locking position to the pull-through position is only possible after a predetermined retaining force acting in the direction of motion has been overcome. The retaining force is preferably high enough for the tensioning chain to be retained in the locking position 18 by the retaining means against the direction of gravity 22, and the retaining means 20 can be overcome by a manually applied force.

The retaining means 20 is arranged in a region 24 which the tensioning chain passes over during the movement of the tensioning chain between the locking position 18 and the pull-through position 16.

The retaining means 20 can, as is represented in FIG. 1, comprise at least one catch projection 26, one catch projection 26 being preferably provided at either side of the locking slot 10. The catch projection 26 is designed to be elastically deflectable at least in sections and can comprise a spring element. According to FIG. 1, the at least one catch projection 26 preferably comprises an elastically deformable catch knob 28 of an elastomer material, such as plastics, natural rubber and/or caoutchouc. The at least one catch projection 26 is arranged in the direction of the clear width 14 laterally next to or at the slot.

Figure 2:
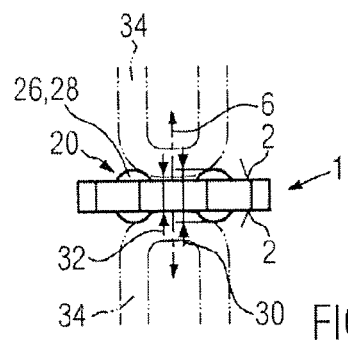

FIG. 2 shows a view of the locking plate 1 of FIG. 1 in the direction of the arrow II. The catch projection 26 of the retaining means 20 projects on at least one flat side 2, preferably at both flat sides 2, in the longitudinal direction 6. At the point of the retaining means 20 or the catch projection 26, respectively, the thickness 30 of the locking plate 1 including the retaining means 20 is greater than the greatest distance 32 of the two chain links of the same orientation separated by the chain link in the locking slot 10 at the point of the retaining means 20. In FIG. 2, the chain links 34 or their bows facing each other are indicated by phantom lines. With this dimensioning, the tensioning chain cannot be slid past the retaining means 20 without hitting against the catch projections 26 or deflecting them. To deflect the catch projections, a retaining force must be overcome. The tensioning chain can be at least temporarily fixed in the locking position 18 for assembly purposes.

The catch projections can be part of an elastic body thickened at both its ends which is inserted in the locking plate and held with positive fit.

Figure 3:
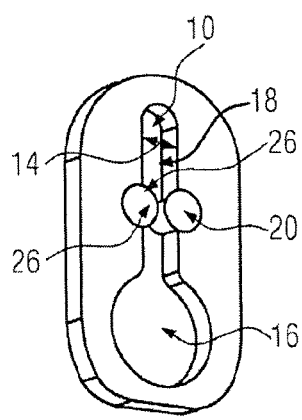
Figure 4:
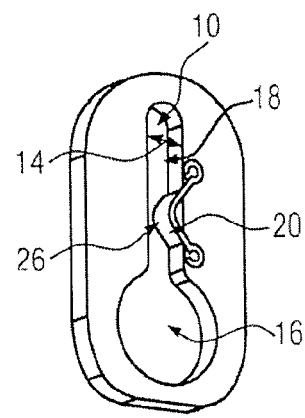

FIGS. 3 and 4 show further possible embodiments of the retaining means 20. For the sake of simplicity, only differences to the embodiment of FIGS. 1 and 2 are discussed.

In both embodiments, the retaining means 20 projects with its at least one catch projection 26 into the locking slot 10 and narrows the latter. At the point of the retaining means 20, the clear width 14 of the locking slot 10 is reduced such that it is smaller than the thickness d of a chain link 34 (cf. FIG. 7) of the locking chain. Thus, in the embodiments of FIGS. 3 and 4, the tensioning chain can neither be moved between the pull-through position 16 and the locking position 18 without overcoming a predetermined retaining force.

FIG. 3 shows an embodiment in which the catch projections 26 are made of an elastically compressible material. As in the embodiment of FIGS. 1 and 2, the retaining means comprises two one-piece catch bodies arranged at either side of the slot. Possibly, one single catch projection 26 is sufficient (as also in FIG. 1) to apply the required retaining force.

In FIG. 4, the retaining means 20 is made at only one side of the slot in the form of a leaf spring pressed into the locking plate, for example of metal. Of course, such springs can also be arranged at either side of the slot. A leaf spring as it is shown in FIG. 4, or a flat spiral spring with a knob-like attachment, can also be employed instead of the catch knobs 28 in FIG. 1.

Figure 5:
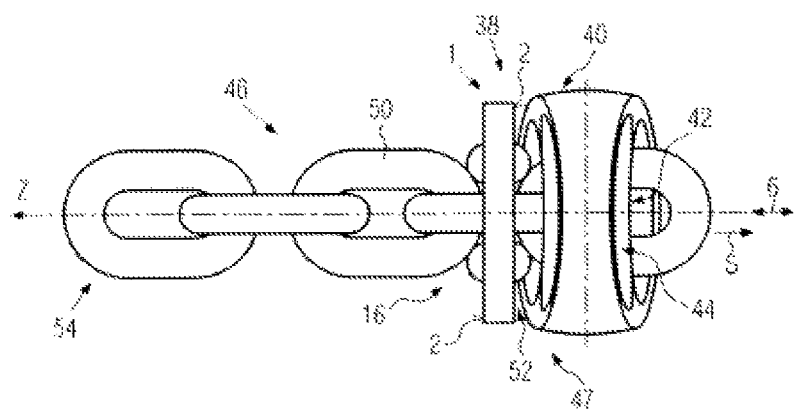

FIG. 5 shows an arrangement 38 for tensioning a tire chain with a locking plate 1 of one of the above-described embodiments—here the embodiment of FIG. 1—and a pull-through bracket 40. The pull-through bracket 40 has two pull-through openings 42, 44 oriented essentially parallel to each other, whose clear inner contours are each greater than the outer contour of the tensioning chain 46, so that the tensioning chain can be pulled through the pull-through openings 42, 44 without blocking. In the position shown in FIG. 5, the tensioning chain 46 extends through the one pull-through opening 42 of the pull-through bracket 40 and the pull-through opening 8 of the locking plate 1 arranged in alignment behind it in the longitudinal direction 6 of the tensioning chain 46. The end of the locking plate 1 with the locking slot 10 projects beyond the pull-through bracket 40, so that the side of the pull-through opening 44 facing the locking plate 1 is not covered by the locking plate 1. For tensioning, a pulling force Z is applied to the tensioning chain, and the chain is pulled through the pull-through opening 42 of the pull-through bracket 40. The locking plate 1 can be moved with the tensioning chain 46 and at the end of the tensioning operation along the tensioning chain 46 to the pull-through bracket 40, or the tensioning chain 46 is simultaneously pulled through the pull-through opening 42 of the pull-through bracket 40 and the pull-through opening 8 of the locking plate 1 with the locking plate 2 manually held at the pull-through bracket 40.

Figure 6:
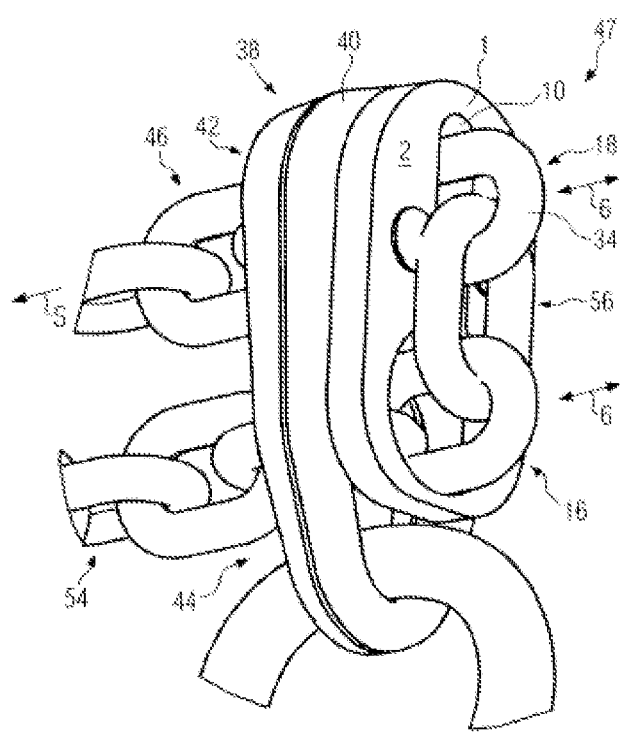

Subsequently, the tensioning chain 46 is transferred from the pull-through position 16 shown in FIG. 5 to the locking position 18 in which the locking plate 1 is moved transversely to the longitudinal direction 6 relative to the pull-through bracket 40, such that a chain link enters the locking slot 10. In the course of this movement, the retaining means 20 is activated. The locking slot 10 is here preferably oriented to be parallel to the connecting line of the two pull-through openings 42, 44 of the pull-through bracket 40. At the end of this movement, the chain link 18 reaches the tensioning position 18 (cf. FIG. 1) in the locking slot 10. The locking position 18 is aligned with the pull-through opening 42, and the pull-through position 16 and/or the pull-through opening 8 is aligned with the pull-through opening 44. Thereby, the operating position 47 is achieved. After the pulling force Z has been removed, the tensioning chain 46 is held in position by the locking plate 1 pressed against the pull-through bracket 40, and the tension force S prevails in the tensioning chain (FIG. 6).

The tensioning chain 46 can hardly get loose from the locking position 18 against the tension force S in the operating position 47. This is because, after the pulling force Z has been removed, the tension force S pulls the locking plate 1 over the locking slot 10 against the pull-through bracket 40 fixed to the rest of the tire chain. In the process, the chain link 50 following the chain link located in the locking slot is pressed against the locking plate 1 at the flat side 2 of the locking plate 1 facing away from the pull-through bracket 40. This impedes the movement of the chain link 50 back from the locking position 18 to the pull-through position 16 against the resistance of the retaining means 20.

As FIG. 5 shows, the locking plate 1 can comprise positioning elements 52 which cooperate with positioning elements 52 on the side of the pull-through bracket and position the locking plate 1 in a predetermined operating position in the direction transverse to the longitudinal direction 6 and relative to the pull-through bracket 40 when the tension force S presses the locking plate 1 against the pull-through bracket 40. The positioning elements 52 can in particular be formed by the at least one catch projection 52 if the latter projects in the direction perpendicular to the flat sides 2. As an alternative or in addition, a separate projection (or an indentation) can also be provided as a positioning aid at the locking element 1, in particular its flat side or its edge. The latter in particular makes sense in the embodiments of FIGS. 3 and 4, where the flat sides 2 have no other projections or indentations. As an alternative or in addition, the pull-through bracket 40 can be provided with a positioning element 52, for example in the form of a projection which cooperates with the opening 4, for example in a region between the locking position 18 and the pull-through position 16.

After the operating position has been reached, the free end 54 of the tensioning chain is bent over about 180° so that it forms a loop and is inserted through the pull-through opening 8 of the locking plate 1 and the pull-through opening 44 of the pull-through bracket 40. This results in the position represented in FIG. 6. As can be seen, the section of the tensioning chain 46 to which the tension force S is applied is in its locking position 18, while the forceless and loose end 54 of the tensioning chain 46 is in the pull-through position 16 of the locking plate 1.

The locking position 18 and the pull-through position 16 are spaced apart such that the loop 56 preferably consists of exactly one chain link which comes to lie parallel to the flat sides 2 of the locking plate 1. To assume this position, the distance of the center 58 (cf. FIG. 1) of the locking position 18 to the center 60 (cf. FIG. 1) of the pull-through position 16 is between the sum l+b of the inner clear length l and the inner clear width b as the approximate lower limiting value, and the sum L+B of the outer length L and the outer width B of the chain links of the tensioning chain.

Figure 7:
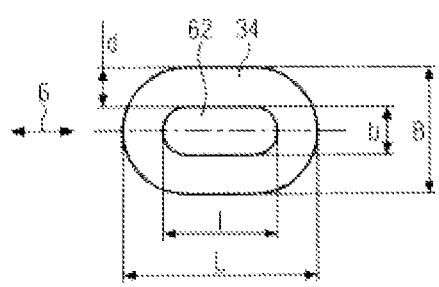

FIG. 7 by way of example shows the corresponding dimensions at a chain link 39 of a round steel or a profile chain. The inner width b is the clear width of the central opening 62 of a chain link in the longitudinal direction 6 of the chain. The outer width B is the total width of the chain link B in the plane spanned by the central opening.

The outer length L corresponds to the length of the chain link in the longitudinal direction 6. The inner length l corresponds to the length of the central opening of the chain link in the longitudinal direction 6.

The chain link is made of a material of thickness d, for example of round steel or a square bar steel.

The invention claimed is:
1. An arrangement for tensioning a tire chain by means of a tensioning chain, comprising a locking plate with a pull-through opening and a locking slot connected to the pull-through opening, wherein the tensioning chain can be received to be movable between a pull-through position arranged in the region of the pull-through opening and a locking position arranged in the region of the locking slot, and a pull-through bracket with at least two pull-through openings, wherein the locking plate and the pull-through bracket are configured so that they can be arranged in an operating position in which the locking slot and the pull-through opening of the locking plate are respectively aligned with the pull-through openings of the pull-through bracket, wherein the locking slot has a clear width greater than a thickness and smaller than an external width of the chain links of the tensioning chain, and with the pull-through opening of the locking slot having an inner contour into which an outer contour of the tensioning chain can be entered, and wherein the tensioning chain can be received transverse to a longitudinal extension of the tensioning chain to be captively movable between a locking position arranged in the region of the locking slot and the pull-through position arranged in the region of the pull-through opening of the locking slot, and wherein between the locking position and the pull-through position, at least one retaining means cooperating with the tensioning chain is provided, the retaining means comprising at least one catch projection and the at least one catch projec- tion extends away from the locking plate in a longitudinal direction of the tensioning chain.

2. An arrangement for tensioning a tire chain by means of a tensioning chain, comprising a locking plate with a pull-through opening and a locking slot connected to the pull-through opening, wherein the tensioning chain can be received to be movable between a pull-through position arranged in the region of the pull-through opening and a locking position arranged in the region of the locking slot, and a pull-through bracket with at least two pull-through openings, wherein the locking plate and the pull-through bracket are configured so that they can be arranged in an operating position in which the locking slot and the pull-through opening of the locking plate are respectively aligned with the pull-through openings of the pull-through bracket.

3. The arrangement for tensioning tire chains of claim 2, wherein the locking slot has a clear width greater than a thickness and smaller than an external width of the chain links of the tensioning chain, and with the pull-through opening of the locking slot having an inner contour into which an outer contour of the tensioning chain can be entered, and wherein the tensioning chain can be received transverse to a longitudinal extension of the tensioning chain to be captively movable between a locking position arranged in the region of the locking slot and the pull-through position arranged in the region of the pull-through opening of the locking slot.

4. The arrangement according to claim 3, wherein between the locking position and the pull-through position, at least one retaining means cooperating with the tensioning chain is provided.

5. The arrangement according to claim 4, wherein the retaining means comprises at least one catch projection.

6. The arrangement according to claim 5, wherein the at least one catch projection is arranged in a region over which the tensioning chain passes during movement from the pull-through to the locking position.

7. The arrangement according to claim 5, wherein the at least one catch projection is configured to be elastically deflectable at least in sections.

8. The arrangement according to claim 5, wherein the at least one catch projection comprises an elastically deformable catch knob.

9. The arrangement according to claim 5, wherein, measured at the point of the retaining means, a thickness of the locking plate including the retaining means is greater than a greatest distance of two chain links of the tensioning chain separated by one chain link.

10. The arrangement according to claim 4, wherein the retaining means is arranged in a direction of a width laterally next to or at the locking slot.

11. The arrangement according to claim 3, wherein at least one catch projection each is provided at either side of the locking slot.

12. The arrangement according to claim 3, wherein the locking plate comprises at least two flat sides over which at least one catch projection projects.

13. The arrangement according to claim 3, wherein an amount of a distance of a center of the locking position from the center of the pull-through position is between a sum of an inner clear length and an inner clear width and a sum of an outer length and an outer width of the chain links of the tensioning chain.

14. The arrangement according to claim 2, wherein in the operating position, the locking plate and the pull-through bracket are pressed against each other essentially exclusively by a tension force prevailing in the tensioning chain.

15. An arrangement for tensioning a tire chain by means of a tensioning chain, comprising a locking plate with a pull-through opening and a locking slot connected to the pull-through opening, wherein the tensioning chain can be received to be movable between a pull-through position arranged in the region of the pull-through opening and a locking position arranged in the region of the locking slot, and a pull-through bracket with at least two pull-through openings, wherein the locking plate and the pull-through bracket are configured so that they can be arranged in an operating position in which the locking slot and the pull-through opening of the locking plate are respectively aligned with the pull-through openings of the pull-through bracket, wherein the operating position is fixed in a plane transverse to a longitudinal direction of the tensioning chain by cooperation of the positioning elements of the pull-through bracket and the locking plate.

16. An arrangement for tensioning a tire chain by means of a tensioning chain, comprising a locking plate with a pull-through opening and a locking slot connected to the pull-through opening, wherein the tensioning chain can be received to be movable between a pull-through position arranged in the region of the pull-through opening and a locking position arranged in the region of the locking slot, and a pull-through bracket with at least two pull-through openings, wherein the locking plate and the pull-through bracket are configured so that they can be arranged in an operating position in which the locking slot and the pull-through opening of the locking plate are respectively aligned with the pull-through openings of the pull-through bracket, wherein the locking plate comprises at least one catch projection cooperating with the tensioning chain, the projection serving as a positioning element.

* * * * *